United States Patent
Lu et al.

(10) Patent No.: US 11,734,574 B1
(45) Date of Patent: Aug. 22, 2023

(54) NEURAL BREGMAN DIVERGENCES FOR DISTANCE LEARNING

(71) Applicant: Booz Allen Hamilton Inc., McLean, VA (US)

(72) Inventors: Fred Sun Lu, Camas, WA (US); Edward Simon Paster Raff, Jamesville, NY (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 17/689,185

(22) Filed: Mar. 8, 2022

(51) Int. Cl.
*G06N 3/084* (2023.01)
*G06N 3/048* (2023.01)

(52) U.S. Cl.
CPC ............. *G06N 3/084* (2013.01); *G06N 3/048* (2023.01)

(58) Field of Classification Search
CPC ......... G06N 3/084; G06N 3/04; G06N 3/0635
See application file for complete search history.

(56) References Cited

U.S. PATENT DOCUMENTS

| | | | | |
|---|---|---|---|---|
| 11,205,103 | B2* | 12/2021 | Zhang | G06K 9/6269 |
| 11,531,879 | B1* | 12/2022 | Teig | G06N 3/04 |
| 2017/0083608 | A1* | 3/2017 | Ye | G06N 20/10 |
| 2018/0165554 | A1* | 6/2018 | Zhang | G06K 9/6256 |
| 2019/0114544 | A1* | 4/2019 | Sundaram | G06N 3/045 |
| 2020/0134461 | A1* | 4/2020 | Chai | G06N 3/10 |
| 2020/0242250 | A1* | 7/2020 | Chen | G06F 21/577 |
| 2021/0073615 | A1* | 3/2021 | Niwa | G06N 3/0454 |
| 2021/0133571 | A1* | 5/2021 | Azizan Ruhi | G06N 3/08 |
| 2021/0383237 | A1* | 12/2021 | Tan | G06N 3/084 |
| 2022/0076114 | A1* | 3/2022 | Shaker | G06Q 10/08355 |
| 2022/0114405 | A1* | 4/2022 | Zhang | G06N 3/0472 |
| 2022/0253713 | A1* | 8/2022 | Amid | G06N 3/0454 |

OTHER PUBLICATIONS

Amos, Brandon, Lei Xu, and J. Zico Kolter. "Input convex neural networks." International Conference on Machine Learning. PMLR, 2017. (Year: 2017).*
Shi, Zhan, Xinhua Zhang, and Yaoliang Yu. "Bregman divergence for stochastic variance reduction: saddle-point and adversarial prediction." Advances in Neural Information Processing Systems 30 (2017). (Year: 2017).*

(Continued)

*Primary Examiner* — Kamran Afshar
*Assistant Examiner* — Randall K. Baldwin
(74) *Attorney, Agent, or Firm* — Buchanan Ingersoll & Rooney PC

(57) ABSTRACT

A method, system, and computer program product for configuring a computer for data similarity determination using Bregman divergence may include storing a data set having plural data pairs with one or more data points corresponding to one or more features and generating a trained input convex neural network (ICNN) using the data set, the ICNN having one or more parameters. Training the ICNN may include extracting one or more features for each piece of data in the first data pair, generating an empirical Bregman divergence for the first data pair, and computing one or more gradients between the one or more features within the first data pair using known target distances and the computed empirical Bregman divergence.

12 Claims, 4 Drawing Sheets

(56) References Cited

OTHER PUBLICATIONS

Amid, Ehsan, et al. "Robust bi-tempered logistic loss based on Bregman divergences." Advances in Neural Information Processing Systems 32 (2019). (Year: 2019).*
Sun, Chengjin, Sizhe Chen, and Xiaolin Huang. "Double backpropagation for training autoencoders against adversarial attack." arXiv preprint arXiv:2003.01895 (2020): 1-8 (Year: 2020).*
Raff, Edward. "Exact Acceleration of K-Means++ and K-Means||"arXiv preprint arXiv:2105.02936 (2021). (Year: 2021).*
Yang, Tsung-Yen, et al. "Projection-based constrained policy optimization." arXiv preprint arXiv:2010.03152 (2020): 1-24 (Year: 2020).*
Murua, Alejandro, and Nonvikan Karl-Augustt Alahassa. "The Shallow Gibbs Network, Double Backpropagation and Differential Machine learning." ScienceOpen Preprints (2021): 1-58 (Year: 2021).*
Amos et al., "Input Convex Neural Networks", 2017, 10 pages.

* cited by examiner

NEURAL BREGMAN DIVERGENCES FOR DISTANCE LEARNING

FIELD

The present disclosure relates to methods and systems for configuring a computer for data classification similarity determination using Bregman divergence.

BACKGROUND

Learning a task-relevant metric among samples is a common application of machine learning, with use in retrieval, clustering, and ranking. A classic example of retrieval is in visual recognition where given an image of an object class, a system tries to identify the class of the object based on an existing labeled dataset by learning a measure of similarity between pairs of images in the dataset. Recently, with the broad successes of deep learning, there has been a surge of interest in deep metric learning in which neural networks are used to automatically learn these similarities between objects. The traditional approach to deep metric learning is to learn an embedding function $\varphi$ over the input space so that a simple distance measure between pairs of embeddings corresponds to task-relevant spatial relationships between the inputs. The embedding function $\varphi$ is computed by a neural network, which is learned to encode those spatial relationships. For example, the basic Euclidean distance metric can be used to measure the distance between two samples x and y as $\|\varphi(x)-\varphi(y)\|_2$. This distance is critical in two ways: 1) it is used to define the loss functions, such as triplet loss or contrastive loss, to dictate how this distance should be used to capture the task-relevant properties of the input space; and 2) since $\varphi$ is trained to optimize the loss function, the distance function influences the embedding function learned. However there are limitations to this traditional approach in that many tasks can be formulated where the underlying distance measure should be asymmetric, which by definition cannot be captured by any valid distance metric, e.g. Euclidean distance. For example, asymmetric tasks can include determining the similarity between text snippets, determining image overlap distance, and determining divergences between probability distributions. Further, selecting a fixed distance measure, e.g. Euclidean distance, relies on the ability of the embedding network to project the inputs to a space where the distance measure is effective and for many tasks this is not possible, e.g., learning distances on graphs where the triangle inequality does not hold. An example of triangle inequality, i.e. asymmetrical object retrieval, is illustrated in FIG. 1. FIG. 1 illustrates a first image 102 of object 104, a second image 106 of object 108, and a third image 110 of object 112. The distance between the object 104 and the object 112 should be larger than both the distance between the object 104 and the object 108 and the distance between the object 108 and the object 112. This is because there is no similarity between the object 104 and the object 112, but there is a fifty percent similarity between the objects 104 and 108 and the object 108 and 112. Therefore, the relationship between the three objects 104, 108, and 112 violate triangle inequality because modeling this relationship would require asymmetric measures and thus this relationship imposes limits on how far any metric based approach can fully realize the visual similarity between the three objects 104, 108, and 112. To address these limits in determining a distance measure between embeddings, a Bregman divergence may be used. A Bregman divergence fundamentally computes the divergence between two points x and y from a space X using first-order Taylor approximations of a generating function $\varphi$. This generating function is defined over X and can be thought of as (re)encoding or "summarizing" points from X However, current Bregman divergences are computed by learning an appropriate divergence measure over a direct representation of the divergence (D) of the function $\varphi$, which comes with significant costs to run-time and representational capacity. Thus, there is a need for a novel solution for more effectively and efficiently learning a Bregman divergence.

SUMMARY

A method for configuring a computer for data classification similarity determination using Bregman divergence is disclosed. The method includes storing a data set, the data set having plural data pairs with one or more data points corresponding to one or more features, wherein a first given feature of a first piece of data in a first data pair has a known target distance to a second given feature of a second piece of data in the first data pair; training an input convex neural network (ICNN) using the data set, the ICNN having one or more parameters, wherein training the ICNN includes: extracting one or more features for each piece of data in the first data pair; generating an empirical Bregman divergence for the data pair; computing one or more gradients between the one or more features within the first data pair based on the known target distance between the one or more features of the first data pair and the computed empirical Bregman divergence, the gradient being computed using double backpropagation; and generating a trained ICNN configured to output a Bregman divergence function for a data pair based on the one or more gradients.

A system configuring a computer for data similarity determination classification using Bregman divergence. The system including a memory configured to: store a data set, the data set having plural data pairs with one or more data points corresponding to one or more features, wherein a first given feature of a first piece of data in a first data pair has a known target distance to a second given feature of a second piece of data in the first data pair; and a processing device configured to: train an input convex neural network (ICNN) using the data set, the ICNN having one or more parameters, wherein training the ICNN includes: extracting one or more features for each piece of data in the first data pair; generating an empirical Bregman divergence for the data pair; computing one or more gradients between the one or more features within the first data pair based on the known target distance between the one or more features of the first data pair and the computed empirical Bregman divergence, the gradient being computed using double backpropagation; and generate a trained ICNN configured to output a Bregman divergence function for a data pair based on the one or more gradients.

A computer program product for configuring a computer for data similarity determination classification using Bregman divergence. The computer program product including: a computer-readable storage medium having program instructions embodied therewith, the program instructions executable by a computer to cause the computer to perform a method, including: storing a data set, the data set having plural data pairs with one or more data points corresponding to one or more features, wherein a first given feature of a first piece of data in a first data pair has a known target distance to a second given feature of a second piece of data in the first data pair; training an input convex neural network (ICNN) using the data set, the ICNN having one or more parameters, wherein training the ICNN includes: extracting the one or more features for each piece of data in the first data pair; generating an empirical Bregman divergence for the data pair; computing one or more gradients between the one or more features within the first data pair based on the known target distance between the one or more features of the first data pair and the computed empirical Bregman divergence, the gradient being computed using double backpropagation; and generating a trained ICNN configured to output a Bregman divergence function for a data pair based on the one or more gradients.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

DETAILED DESCRIPTION

Figure 1:
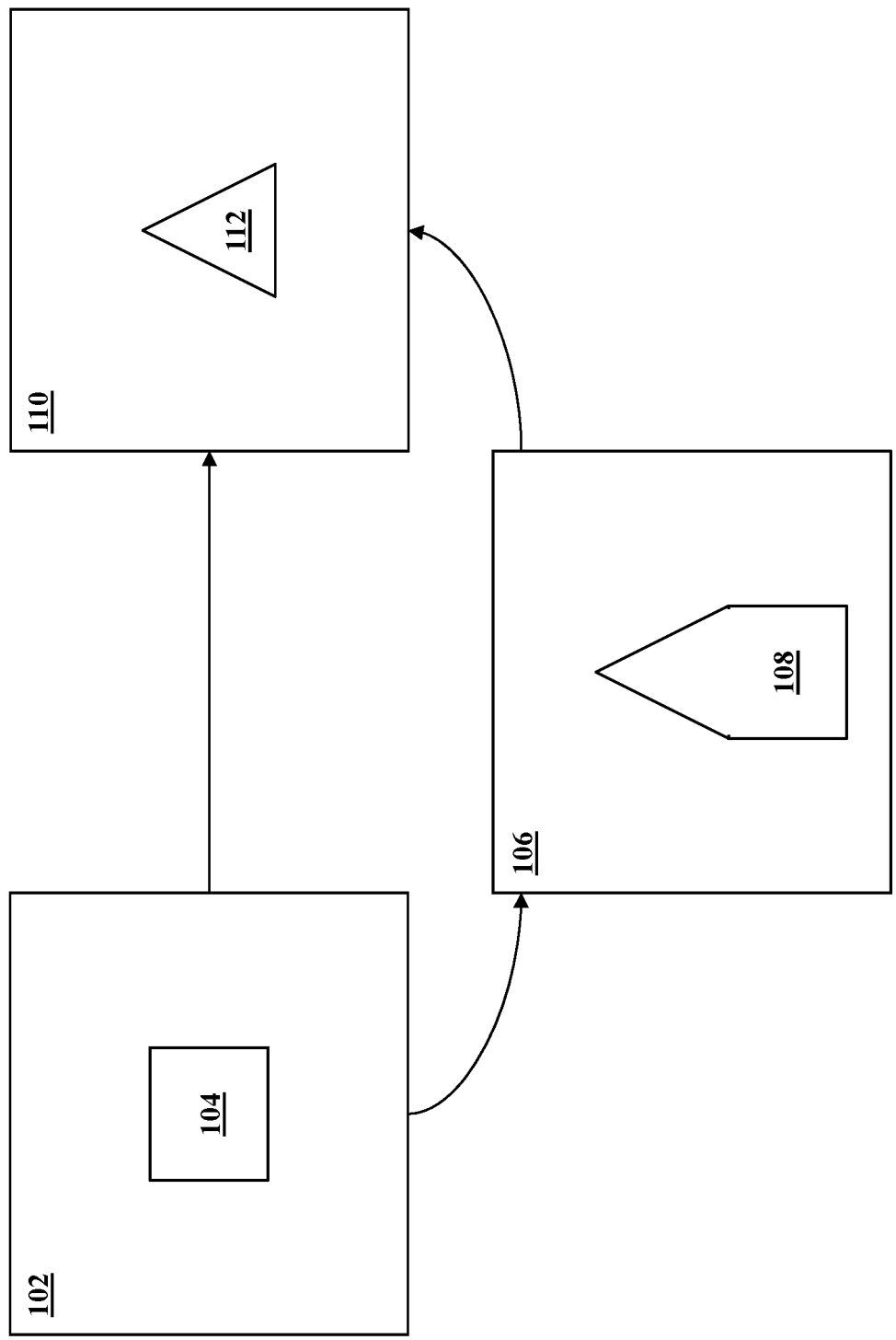
FIG. 1 is a block diagram illustrating asymmetric object retrieval in accordance with the prior art.

A Bregman divergence fundamentally computes the divergence between two points, e.g., x and y, from a space X Current methods and technologies compute divergences using first-order Taylor approximations of a generating function $\varphi$. This generating function $\varphi$ is defined over X and can be thought of as (re)encoding or "summarizing" points from X. A proper and informative generating function $\varphi$ is incredibly important as different generating functions $\varphi$ can capture different properties of the spaces over which they are defined. A Bregman divergence may be computed using the following equation:

$$D_\varphi(x,y) = \varphi(x) - \varphi(y) - \{\nabla\varphi(y), x-y\} \quad \text{(Equation 1)}$$

In equation 1, $(\cdot,\cdot)$ represents the dot product and $\nabla\varphi(y)$ is the gradient of the generating function $\varphi$ evaluated at y. For example, if $X=\mathbb{R}^d$ and $\varphi$ is the squared Euclidean distance $$\left(\varphi(y) = \|y\|_2^2 = \sum_{d=1}^{D} y_d^2\right), \text{ then } \nabla\varphi(y) = 2y.$$

This means $D_\varphi(x, y) = \|x-y\|_2^2$. As an alternative example, if X is the D-dimensional discrete probability distributions (i.e., $x \in X \leftrightarrow \sum_d x_d = 1$ and $0 \le x_d \le 1$, $\forall d$) then $\varphi(x) = \{x, \log x\}$ yields the Kullback-Leibler Bregman $$D_\varphi(x, y) = \sum_d x_d \log \frac{x_d}{y_d}.$$

divergence. Therefore, this shows how a properly defined generating function $\varphi$ can capture critical, inherent properties of the underlying space X The core requirement of a Bregman divergence is that the generating function $\varphi$ be strictly convex and continuously differentiable. This core requirement is fairly straightforward, however, the hypothesis space of Bregman divergences (i.e., the space of all possible Bregman divergences $D\varphi(x, y)$ that can be generated by a strictly convex and continuously differentiable function $\varphi$) is valuable due to the fact that many core machine learning measures are special cases of Bregman divergences such as, the squared Euclidean distance, the Kullback-Leibler, and the Ikura-Saito divergences, and others. Furthermore it has been shown that the class of symmetric Bregman divergences are equivalent to the Mahalanobis distances (of which the Euclidean distance is a special case), leaving the current "standard" class of modeling assumptions within the hypothesis space. While many special cases of the Bregman divergence are in use today, little progress has been made in effectively learning Bregman divergences. To learn an arbitrary Bregman divergence prior methods and technologies have used max affine representations of the generating function $\varphi$ for mathematical convenience, as it allows the right hand side of Equation 1 to cancel out and to directly work with the representation $D\varphi(x, y)$. By showing that representation results in a valid $D\varphi(x, y)$ under correct constraints prior methods are able to apply their learning approach to maintain those constraints. However, this comes at significant cost to run-time and representational capacity. Exemplary embodiments of the methods and systems provided herein address these current inefficiencies by providing a neural method to automatically and more efficiently compute Bregman divergences by learning more informative functions $\varphi$. In particular, exemplary embodiments of the methods and systems provided herein learn the convex function $\varphi$ directly instead of over a direct representation of $D\varphi$. The methods and systems provided herein learn the convex function $\varphi$ directly by resolving two constraints: 1) efficiently computing $D\varphi$ from just $\varphi$ using double backpropagation; and 2) learning $\varphi$ itself while guaranteeing that the $\varphi$ is convex using an Input Convex Neural Network (ICNN).

System Overview

Figure 2:
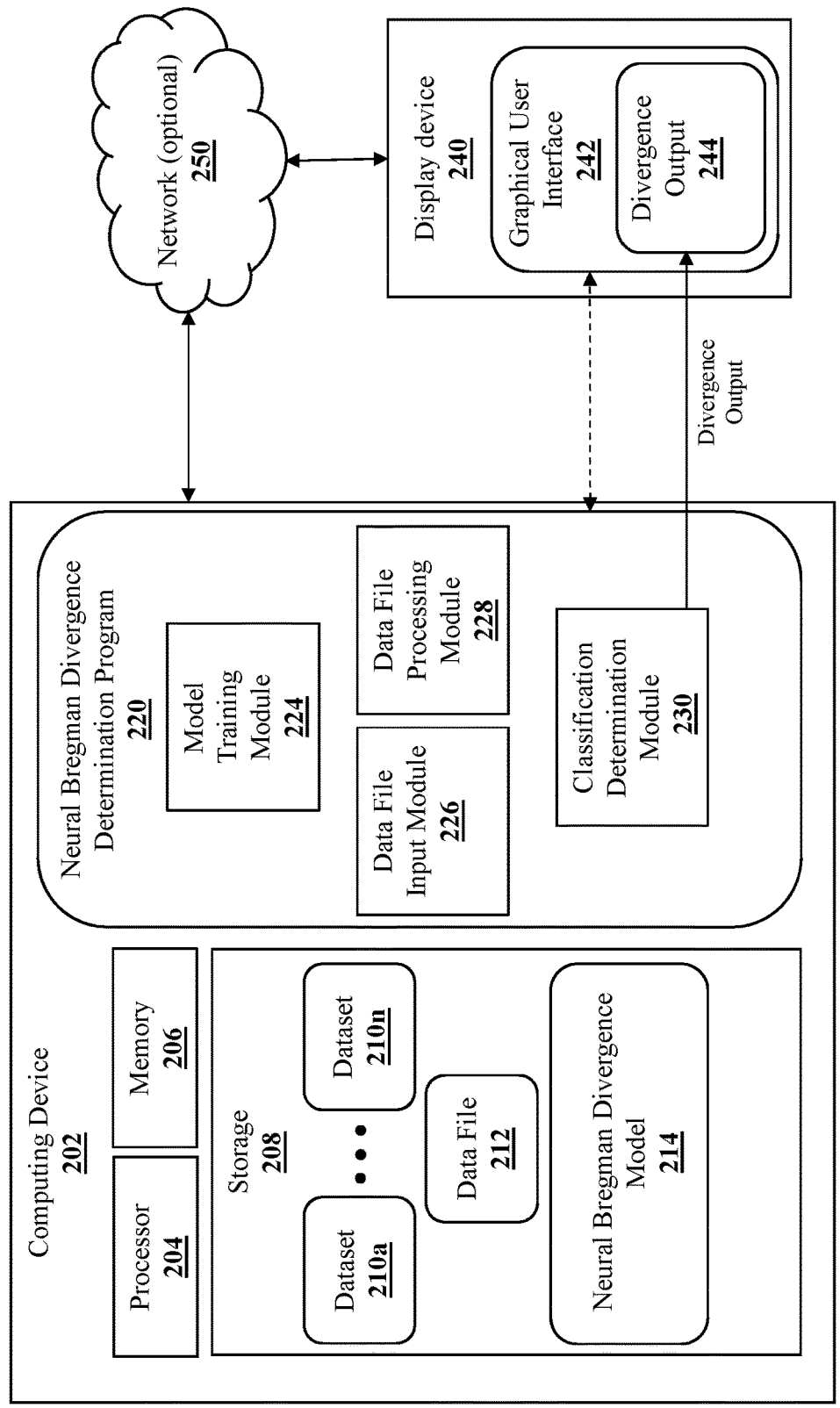
FIG. 2 is a block diagram illustrating a high-level system architecture for configuring a computer for data similarity determination using Bregman divergence in accordance with exemplary embodiments.

FIG. 2 illustrates system 100 for configuring a computer for data similarity determination using Bregman divergence in accordance with exemplary embodiments.

The computing device 202 includes, for example, a processor 204, a memory 206, a storage 208, and a neural Bregman divergence determination program 220. The device 202 may be a desktop computer, a notebook, a laptop computer, a tablet computer, a handheld device, a smartphone, a thin client, or any other electronic device or computing system capable of storing, compiling, and organizing audio, visual, or textual data and receiving and sending that data to and from other computing devices, such as the display device 240.

The processor 204 may be a special purpose or a general purpose processor device specifically configured to perform the functions discussed herein. The processor 204 unit or device as discussed herein may be a single processor, a plurality of processors, or combinations thereof. Processor devices may have one or more processor "cores." In an exemplary embodiment, the processor 204 is configured to perform the functions associated with the modules of the neural Bregman divergence determination program 220 as discussed below with reference to FIGS. 3A-3B.

The memory 206 can be a random access memory, read-only memory, or any other known memory configurations. Further, the memory 206 can include one or more additional memories including the storage 208 in some embodiments. The memory 206 and the one or more additional memories can be read from and/or written to in a well-known manner. In an embodiment, the memory and the one or more additional memories can be non-transitory computer readable recording media. Memory semiconductors (e.g., DRAMs, etc.) can be means for providing software to the computing device such as the neural Bregman divergence determination program 220. Computer programs, e.g., computer control logic, can be stored in the memory 206.

The storage 208 can include, for example, data sets 210a-210n, a data file 212, and a neural Bregman divergence model 214. The storage 208 can be deployed on one or more nodes, e.g., storage or memory nodes, or one or more processing-capable nodes such as a server computer, desktop computer, notebook computer, laptop computer, tablet computer, handheld device, smart-phone, thin client, or any other electronic device or computing system capable of storing, compiling, and/or processing data and computer instructions (e.g., data sets 210a-210n, a data file 212, and neural Bregman divergence model 214), and receiving and sending that data to and from other devices, such as the display device 240. The storage 208 can be any suitable storage configuration, such as, but not limited to, a relational database, a structured query language (SQL) database, a distributed database, or an object database, etc. Suitable configurations and storage types will be apparent to persons having skill in the relevant art.

The datasets 210a-210n may be any known or generated data set containing data pairs. Each of the data pairs of the datasets 210 may include any number of features. The datasets 210 may contain data of any type, for example, but not limited to, image files, text files, sensor data, numerical measurements, or any other suitable data type which will be apparent to those skilled in the art, etc. Further the one or more of the features of each piece of data in a data pair may have a known target distance to another feature of the corresponding piece of data in the data pair. For example, a first given feature of a first piece of data in a first data pair has a known target distance to a second given feature of a second piece of data in the first data pair. For example, a dataset 210 can be generated having data pairs of x-dimensional vectors from a standard Normal distribution. The generated data pairs can have a number of features used to compute the target divergence between the data pairs as well as a number of features used as distractor features. In another embodiment, the datasets 210 can be any known dataset containing data pairs having one or more features such as but not limited to, the INRIA Holidays dataset, the 3d dataset, the 3dd dataset, the octagon dataset, the taxi dataset, and the traffic dataset, etc. While a plurality of data sets 210a-210n are illustrated in FIG. 2, it can be appreciated that the storage 208 can include a single data set 210 or any number of data sets 210. The data of the datasets 210 may be stored in the storage 208 as data tuples. For example, the storage 208 may be a relational database and each tuple, .e.g., each row of the database, contains all the data, e.g., all the features, for an individual piece of data while each column of the storage 208 defines the features of the data.

The data file 212 may be a data file of one or more of the data sets 210a-210n or the data file 212 may be a separate data file. For example, the data file 212 may be a data file of a data set 210 being used to train the neural Bregman divergence model 214. As another example, the data file 212 may be a data file separate from the data set 210 that is input into the neural Bregman divergence model 214 to classify the data file 212. Further, the data file 212 may include a single piece or data, e.g., a single image, or a plurality of pieces of data, e.g., a plurality of images.

The neural Bregman divergence model 214 is a neural network that computes the Bregman divergence between one or more features of a data pair within the dataset 210. In an exemplary embodiment, the neural Bregman divergence model 214 is an Input Convex Neural Network (ICNN) such as deployed by Amos et al. "Input convex neural networks," herein incorporated by reference. The ICNN composes linear layers with non-negative weights $W^+$ and affine functions with unconstrained weights U with convex activation functions $g(\cdot)$. The composition of these three components for the ith layer of an ICNN is given by equation 2, where $z_i$ is the input to the i'th layer and $z_i+1$ is the output.

$$z_i+1=g(W_i^+z_i+U_iz_0+b_i) \quad \text{(Equation 2)}$$

The neural Bregman divergence model 214 uses the Softplus activation $g(x)=\log(1+\exp(x))$ which give the neural Bregman divergence model 214 smoothness and strict convexity. The use of the Softplus activation combined with an appropriate parametrization of the non-negative layers in the ICNN, outperforms the default approach in divergence learning tasks of using piecewise linear activation functions, e.g., ReLU variants for $g(\cdot)=\max(x,0)$. This is because evaluating $\varphi(y)$ involves the second derivatives, and the second derivative of any piecewise learning activation, e.g. the default approach, will be zero almost everywhere, which will cause vanishing gradients in the computation of $\{\nabla\varphi(y), x-y\}$ thereby restricting its capacity to learn. In extended testing, ReLU activation functions prevented effective learning entirely. The generation of the neural Bregman divergence model 214 is discussed in more detail below.

The neural Bregman divergence determination program 220 is a software component that utilizes the data sets 210a-210n stored in the storage 208 to generate the neural Bregman divergence model 214 and then outputs a classification similarity determination of a data file, e.g., the data file 212, utilizing the neural Bregman divergence model 214. In an exemplary embodiment, the neural Bregman divergence determination program 220 includes, a model training module 224, a data file input module 226, a data file processing module 228, and a classification determination output module 230. The neural Bregman divergence determination program 220 is a software component specifically programmed to implement the methods and functions disclosed herein for configuring a computer for data classification using Bregman divergence. The neural Bregman divergence determination program 220 and the modules 224-230 are discussed in more detail below with reference to FIGS. 3A-3B.

The neural Bregman divergence determination program 220 can include a graphical user interface 242. The graphical user interface 242 can include components used to receive input from the computing device 202, and/or the display device 240 and transmit the input to the neural Bregman divergence determination program 220 or conversely to receive information from the neural Bregman divergence determination program 220 and display the information on the computing device 202, and/or the display device 240. In an example embodiment, the graphical user interface 242 uses a combination of technologies and devices, such as device drivers, to provide a platform to enable users of the computing device 202, and/or the display device 240 to interact with the neural Bregman divergence determination program 220. In the example embodiment, the graphical user interface 242 receives input from a physical input device, such as a keyboard, mouse, touchpad, touchscreen, camera, microphone, etc. In an exemplary embodiment, the graphical user interface 242 may display a divergence output 244. While the graphical user interface 242 is illustrated as part of the display device 240, it can be appreciated that the graphical user interface 242 is a part of the neural Bregman divergence determination program 220 and may be a part of the computing device 202, and/or the display device 240.

While the processor 204, the memory 206, the storage 208, and the neural Bregman divergence determination program 220 are illustrated as part of the computing device 202, it can be appreciated that each of these elements or a combination thereof can be a part of a separate computing device.

The display device 240 can include the graphical user interface 242. The display device 240 be any computing device, such as, but not limited to, a cell phone, a server computer, a desktop computer, a notebook, a laptop computer, a tablet computer, a handheld device, a smart-phone, a thin client, or any other electronic device or computing system capable of receiving display signals from another computing device, such as the computing device 202, etc. and outputting those display signals to a display unit such as, but not limited to, an LCD screen, plasma screen, LED screen, DLP screen, CRT screen, etc. For example, the graphical user interface 242 may receive the divergence output 244 from the neural Bregman divergence determination program 220 and display the divergence output 244 on the display device 240. Further, the graphical user interface 242 may receive data input files, e.g., the data file 212, from a user and transmit those data input files, e.g., the data file 212, to the neural Bregman divergence determination program 220. The data input files e.g., the data file 212, can include a single piece of data (e.g., a single image) or multiple pieces of data (e.g., a plurality images). The display device 240 may communicate with the computing device 202 via a hard-wired connection or via the network 250. For example, the display device 240 may have a hard-wired connection to the image device such as, but not limited to, a USB connection, an HDMI connection, a display port connection, a VGA connection, or any other known hard-wired connection capable of transmitting and/or receiving data between the computing device 202 and the display device 240. While the display device 240 is illustrated as being separate from the computing device 202, it can be appreciated that the display device 240 can be a part of the computing device 202.

The optional network 250 may be any network suitable for performing the functions as disclosed herein and may include a local area network (LAN), a wide area network (WAN), a wireless network (e.g., WiFi), a personal area network (PAN) (e.g. Bluetooth), a near-field communication (NFC) network, a mobile communication network, a satellite network, the Internet, fiber optic, coaxial cable, other hardwired networks, infrared, radio frequency (RF), or any combination of the foregoing. Other suitable network types and configurations will be apparent to persons having skill in the relevant art. In general, the network 250 can be any combination of connections and protocols that will support communications between the computing device 202 and the display device 240. In some embodiments, the network 250 may be optional based on the configuration of the computing device 202, and the display device 240.

Figure 3A:
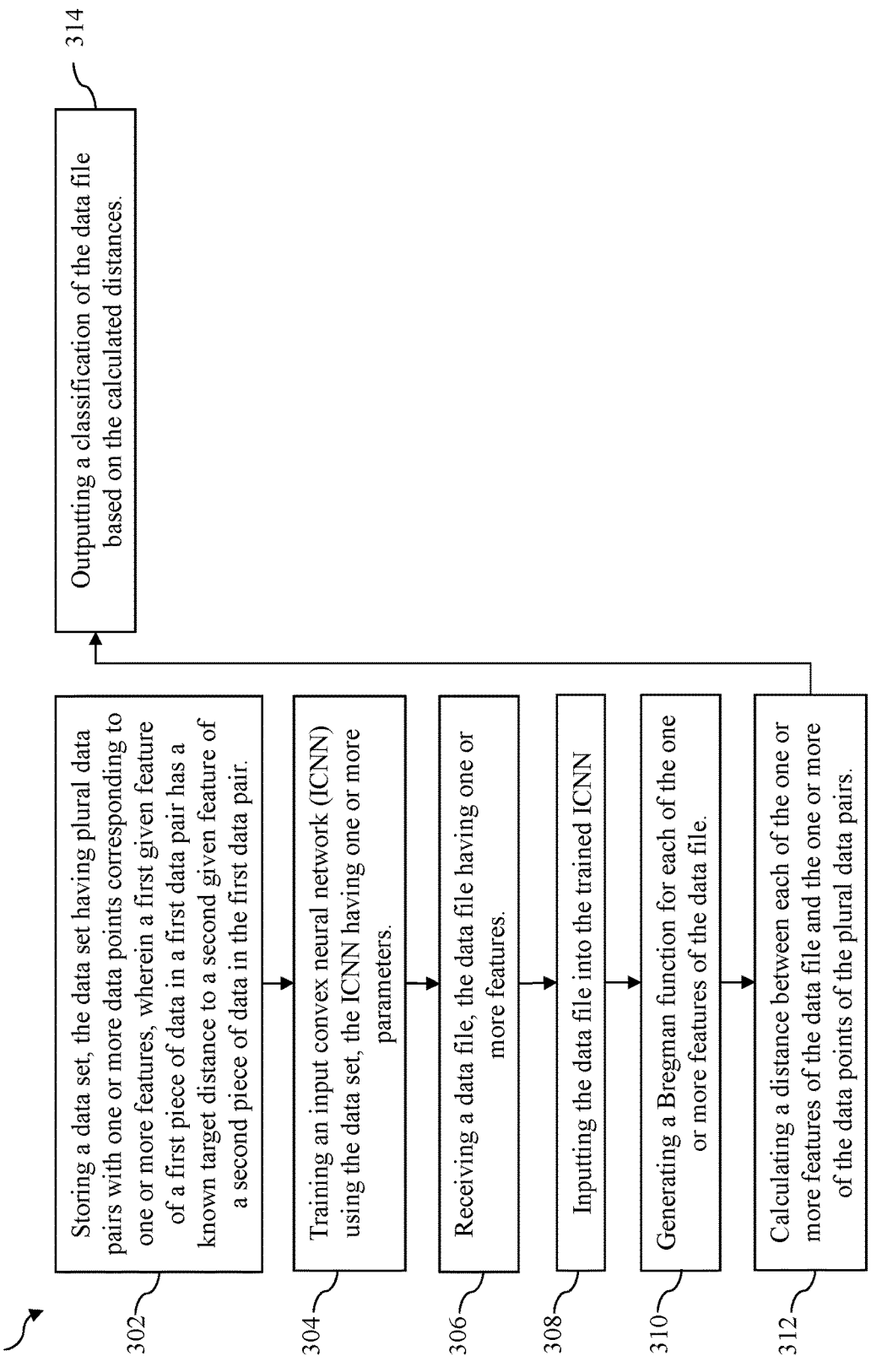
FIGS. 3A-3B is a flowchart illustrating a method for configuring a computer for data similarity determination using Bregman divergence in accordance with exemplary embodiments.
Figure 3B:
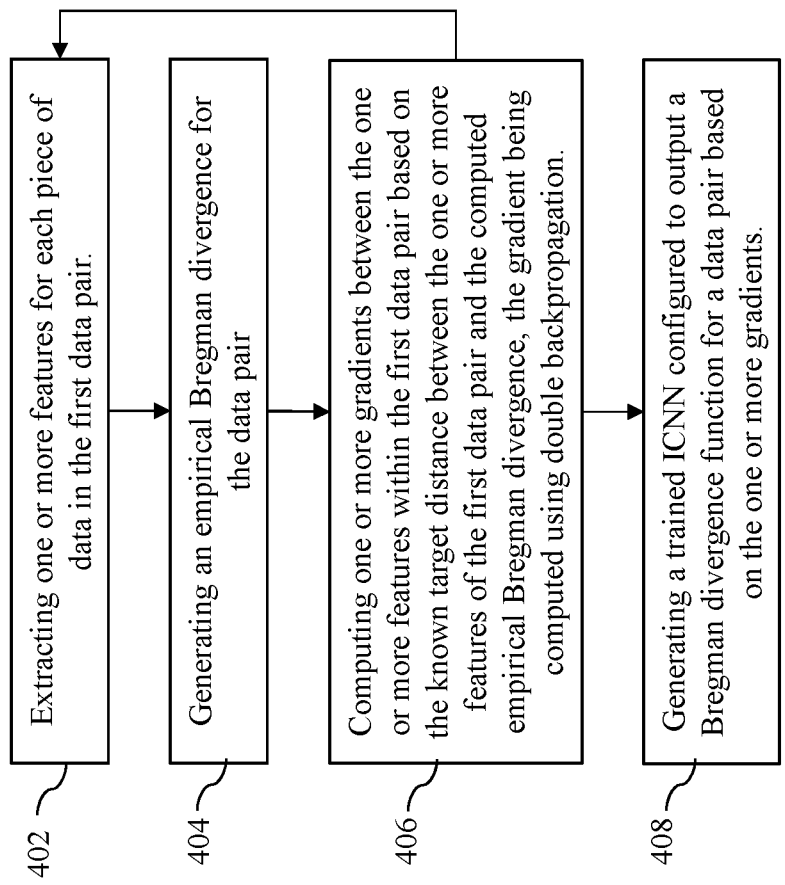

Exemplary Method for Configuring a Computer for Data Similarity Determination Using Bregman Divergence FIGS. 3A-3B illustrates a method 300 for configuring a computer for data similarity determination using Bregman divergence in accordance with exemplary embodiments.

The method 300 can include block 302 of storing a data set, e.g., one or more of the data sets 210a-210n, where each data set includes one or more data pairs with one or more data points that correspond to one or more features. In an exemplary embodiment, a first given feature of a first piece of data in a first data pair has a known target distance to a second given feature of a second piece of data in the first data pair.

The method 300 can include block 304 of training an input convex neural network (ICNN), e.g. the neural Bregman divergence model 214, using the data set 210. The original feature space is rarely ideal for computing the distance measures between samples. Prior metric learning methods generally attempt to apply a linear transformation to the feature space in order to apply a fixed distance function $D(\cdot,\cdot)$, such as Euclidean distance. In prior deep metric learning methods, a neural network $f_\theta$ is used to embed the samples into a latent space where the distance function is more useful [27]. In exemplary embodiments of the method 300, instead of fixing the distance function, a Bregman divergence as the distance measure is learned using Equation 3 where $\tilde{y}=f_\theta(y)$ is treated as a constant:

$$D\varphi(f_\theta(x), f_\theta(y))=\varphi(f_\theta(x))-\varphi(f_\theta(y))-\{\nabla\varphi(\tilde{y}), f_\theta(x)-f_\theta(y)\} \quad \text{(Equation 3)}$$

In training the ICNN using Equation 3, one or more parameters must be learned including those associated with $\varphi$ and those associated with the encoder ($\theta$). During training, the one or more parameters are simultaneously learned through gradient descent, which involves back-propagating through the gradient function $\nabla\varphi(\cdot)$ to update $\theta$ via double back-propagation. In an exemplary embodiment, the model training module 224 can be configured to execute the method of block 304. The training of the neural Bregman divergence model 214 is described in more detail with reference to FIG. 3B.

Referring to FIG. 3B, the method 300 can include block 402 of extracting one or more features for each piece of data in a first data pair, e.g., a data pair of the dataset 210. The features of the data pair may be extracted using any arbitrary neural network feature extractor. In an exemplary embodiment, the model training module 224 can be configured to execute the method of block 402. The block 402 is also illustrated below with reference to steps 1-5 of Algorithm 1 below.

The method 300 can include block 404 of generating an empirical Bregman divergence for the first data pair of the dataset 210. In an exemplary embodiment, the model training module 224 can be configured to execute the method of block 404. The block 404 is also illustrated below with reference to step 7 of Algorithm 1 below.

The method 300 can include block 406 of computing one or more gradients between one or more features within a first data pair of the dataset 210 based on the known target distance between the one or more features of the first data pair and the computed empirical Bregman divergence, e.g. the $\nabla\varphi(y)$ term of Equation 1. In an exemplary embodiment, the gradient is computed using double backpropagation. Double backpropagation allows the use of automatic differentiation to efficiently compute gradients with respect to the inputs in an efficient manner, and the dot-product between a gradient and another value in particular has specialized "Jacobian vector product" operation that ensures the term $\{\nabla\varphi(y), x-y\}$ of Equation 1 can be computed in the cost of evaluating $\varphi(y)$ one additional time. Thus, because there are already three calls to $\varphi$ in Equation 1, there is only a twenty-five percent increase in computational overhead to backpropagate though Equation 1. This is in contrast to current methods for computing the gradient of $\nabla \varphi(y)$ that construct a Hessian, which results in a quadratic increase in computation and memory use of the computing device 202. In an exemplary embodiment, the model training module 224 can be configured to execute the method of block 406. The block 406 is also illustrated below with reference to step 6 of Algorithm 1 below.

The blocks 402-406 of the method 300 may be repeated for each of the one or more data pairs in the dataset 210.

The method 300 can include block 408 of generating a trained ICNN, e.g., the neural Bregman divergence model 214, based on the one or more gradients computed, e.g., the one or more gradients computed in block 408. The trained ICNN, e.g., the neural Bregman divergence model 214 outputs a Bregman divergence function for the one or more data pairs of the dataset 210. In an exemplary embodiment, the model training module 224 can be configured to execute the method of block 304. The block 408 is also illustrated below with reference to steps 8-11 of Algorithm 1 below.

The training of the neural Bregman divergence model 214 as described above with reference to FIG. 3B is further summarized in Algorithm 1:

---

Algorithm 1 Neural Bregman Divergence (NBD) Learning.
Given data tuples $(a_i, b_i)$, our approach (1) learns $f_\theta$ to compute effective ways of featurizing $a_i$, and $b_i$; and (2) learns a function $\varphi$ that can be used to compute a Bregman divergence value $\hat{y}$ between the featurized data points. The computed Bregman divergence is trained via a task-specific loss function l to be close to a target divergence value $y_i$. If a target divergence value isn't available, an implicit loss function can be used.

---

Require: Dataset of pairs and target distance, Loss function
$l(\cdot, \cdot) : \mathbb{R} \to \mathbb{R}$
1: $f_\theta \leftarrow$ any arbitrary neural network as a feature extractor
2: $\varphi \leftarrow$ a ICNN network parameterized as specified by Equation 2
3: for each data tuple $(a_i, b_i)$ with label $y_i$ in dataset do
4:     $x \leftarrow f_\theta(a_i)$      ▷ Perform feature extraction
5:     $y \leftarrow f_\theta(b_i)$
6:     rhs $\leftarrow \langle \nabla \varphi(y), x-y \rangle$ computed with double backprop
      ▷ e.g., using torch.autograd.functional.jvp
7:     $\hat{y} \leftarrow \varphi(x) - \varphi(y)$ − rhs     ▷ Empirical Bregman divergence computed
8:     $l(\hat{y}, y_i)$.backward( )      ▷ Compute gradients
9:     update parameters of $\varphi$ and $\theta$
10: end for
11: return Jointly trained feature extractor $f_\theta$ and learned Bregman Divergence $\varphi$

---

Referring back to FIG. 3A, the method 300 can include block 306 of receiving a data file, e/g/, the data file 212, having one or more features. The neural Bregman divergence determination program 220 may receive the data file 212, for example, but not limited to, from a user of the computing device 202 and/or the display device 240, e.g., via the graphical user interface 242, from the storage 208, and/or from the memory 206. The data file 212 may have one or more of the features of the data set 210 used to train the neural Bregman divergence model 214. In an exemplary embodiment, the data input module 226 can be configured to execute the method of block 306.

The method 300 can include block 308 of inputting the data file 212 into the neural Bregman divergence model 214. For example, the data file 212 may be, but is not limited to, an image of handwritten numbers, such as from the Modified National Institute of Standards and Technology (MNIST) database. In an exemplary embodiment, the data input module 226 can be configured to execute the method of block 308.

The method 300 can include block 310 of generating a Bregman function for each of the one or more features of the data file 212. Continuing with the example above, the one or more features may include, but are not limited to, the curvature, the angularity, and/or the edges of the handwritten numbers of the MNIST image, e.g. the data file 212. In an exemplary embodiment, the data file processing module 228 can be configured to execute the method of block 310.

The method 300 can include block 312 of calculating a distance between each of the one or more features of the data file 212 and the one or more of the data points of the data pairs of the data set 210. The distance is calculated by obtaining the Bregman divergence between the one or more features of the data file 212 and the one or more of the data points of the data pairs of the data set 210 using the generated respective Bregman function for each of the one or more features of the data file 212. For example, a Bregman divergence can be calculated between each of the features of the data file 212 and the known features of the data set 210. In an exemplary embodiment, the data file processing module 228 can be configured to execute the method of block 312.

The method 300 can include block 314 of outputting a data classification similarity determination, e.g., the divergence output 244, of the data file 212 based on the generated Bregman functions for each of the one or more features of the data file 212. The divergence output 244 is generated by determining the smallest Bregman divergence between each of the pairs of features, e.g., the curvature, the angularity, and/or the edges, of the handwritten numbers, e.g. the data file 212, and the known features, e.g. the data points of the data pairs of the data set 210. Continuing with the example above, the values made up of the pairs of features of the data 212 can be classified as being the same as the known data points with the smallest Bregman divergence. For example, the data file 212 may contain a handwritten value that has the smallest Bregman divergence to the number "8" in the data set 210, e.g., the numbers made up of the features can be identified. The neural Bregman divergence determination program 220 may output the divergence output 244 to a user via the graphical user interface 242 on the display 240 and/or the computing device 202. In an exemplary embodiment, the classification determination module 230 can be configured to execute the method of block 314.

A person having ordinary skill in the art would appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, one or more of the disclosed modules can be a hardware processor device with an associated memory.

A hardware processor device as discussed herein can be a single hardware processor, a plurality of hardware processors, or combinations thereof. Hardware processor devices can have one or more processor "cores." The term "non-transitory computer readable medium" as discussed herein is used to generally refer to tangible media such as a memory device.

Various embodiments of the present disclosure are described in terms of an exemplary computing device. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

A system, as used herein, can be in combination with one or more nodes, wherein the system resides in the one or more nodes. A node can be configured to interface or contain one or more components of the systems described herein.

A hardware processor, as used herein, can be a special purpose or general purpose processor device. The hardware processor device can be connected to a communications infrastructure, such as a bus, message queue, network, multi-core message-passing scheme, etc. An exemplary computing device, as used herein, can include a memory (e.g., random access memory, read-only memory, etc.), and can also include one or more additional memories. The memory and the one or more additional memories can be read from and/or written to in a well-known manner. In an embodiment, the memory and the one or more additional memories can be non-transitory computer readable recording media.

Data stored in the exemplary computing device (e.g., in the memory) can be stored on any type of suitable computer readable media, such as optical storage (e.g., a compact disc, digital versatile disc, Blu-ray disc, etc.), magnetic tape storage (e.g., a hard disk drive), solid-state drive, etc. An operating system can be stored in the memory.

In an exemplary embodiment, the data can be configured in any type of suitable data storage configuration or database configuration, such as a relational database, a structured query language (SQL) database, a distributed database, an object database, etc. Suitable configurations and storage types will be apparent to persons having skill in the relevant art.

The exemplary computing device can also include a communications interface. The communications interface can be configured to allow software and data to be transferred between the computing device and external devices. Exemplary communications interfaces can include a modem, a network interface (e.g., an Ethernet card), a communications port, a PCMCIA slot and card, etc.. Software and data transferred via the communications interface can be in the form of signals, which can be electronic, electromagnetic, optical, or other signals as will be apparent to persons having skill in the relevant art. The signals can travel via a communications path, which can be configured to carry the signals and can be implemented using wire, cable, fiber optics, a phone line, a cellular phone link, a radio frequency link, etc..

Memory semiconductors (e.g., DRAMs, etc.) can be means for providing software to the computing device. Computer programs (e.g., computer control logic) can be stored in the memory. Computer programs can also be received via the communications interface. Such computer programs, when executed, can enable the computing device to implement the present methods as discussed herein. In particular, the computer programs stored on a non-transitory computer-readable medium, when executed, can enable a hardware processor device to implement the exemplary methods, or similar methods, as discussed herein. Accordingly, such computer programs can represent controllers of the computing device.

Where the present disclosure is implemented using software, the software can be stored in a computer product or non-transitory computer readable medium and loaded into the computing device using a removable storage drive or communications interface. In an exemplary embodiment, any computing device disclosed herein can also include a display interface that outputs display signals to a display unit, e.g., LCD screen, plasma screen, LED screen, DLP screen, CRT screen, etc.

It will be appreciated by those skilled in the art that the present disclosure can be embodied in other specific forms without departing from the spirit or essential characteristics thereof. The presently disclosed embodiments are therefore considered in all respects to be illustrative and not restrictive. The scope of the disclosure is indicated by the appended claims rather than the foregoing description, and all changes that come within the meaning, range, and equivalence thereof are intended to be embraced therein.

What is claimed is:

1. A method for configuring a computer for data similarity determination using Bregman divergence, the method comprising:

storing a data set, the data set having plural data pairs with one or more data points corresponding to one or more features, wherein a first given feature of a first piece of data in a first data pair has a known target distance to a second given feature of a second piece of data in the first data pair; and training an input convex neural network (ICNN) using the data set, the ICNN having one or more parameters, wherein training the ICNN includes:

for each data pair within the data set:

extracting one or more features for each piece of data in the first data pair;

generating an empirical Bregman divergence for the data pair; and computing one or more gradients between the one or more features within the first data pair based on the known target distance between the one or more features of the first data pair and the empirical Bregman divergence, the one or more gradients being computed using double backpropagation, automatic differentiation to compute the one or more gradients with respect to one or more data inputs, and a dot-product between the one or more gradients and another value;

generating a trained ICNN configured to output an arbitrary Bregman divergence function within a space of all possible Bregman divergences for a data pair based on the one or more gradients;

receiving a data file, the data file having one or more features;

inputting the data file into the trained ICNN;

generating a Bregman function for each of the one or more features of the data file, the one or more features including at least one of curvature and angularity;

calculating a distance between the one or more features of the data file and the one or more data points of the plural data pairs; and outputting a classification of the data file based on the calculated distance.

2. The method of claim 1, wherein the ICNN is trained using Softplus activation.

3. The method of claim 1, wherein the plural data pairs are image pairs.

4. The method of claim 1, wherein the plural data pairs are text pairs.

5. A system configuring a computer for data similarity determination using Bregman divergence, the system comprising:

a memory configured to:
    store a data set, the data set having plural data pairs with one or more data points corresponding to one or more features, wherein a first given feature of a first piece of data in a first data pair has a known target distance to a second given feature of a second piece of data in the first data pair; and
    a processing device configured to:
        train an input convex neural network (ICNN) using the data set, the ICNN having one or more parameters, wherein training the ICNN includes:
        for each data pair within the data set:
            extracting one or more features for each piece of data in the first data pair;
            generate an empirical Bregman divergence for the data pair; and
            compute one or more gradients between the one or more features within the first data pair based on the known target distance between the one or more features of the first data pair and the empirical Bregman divergence, the one or more gradients being computed using double backpropagation, automatic differentiation to compute the one or more gradients with respect to one or more data inputs, and a dot-product between the one or more gradients and another value;
        generate a trained ICNN configured to output an arbitrary Bregman divergence function within a space of all possible Bregman divergences for a data pair based on the one or more gradients;
        receive a data file, the data file having one or more features;
        input the data file into the trained ICNN;
        generate a Bregman function for each of the one or more features of the data file, wherein the one or more features include at least one of curvature and angularity;
        calculate a distance between the one or more features of the data file and the one or more data points of the plural data pairs; and
            output a classification of the data file based on the calculated distance.

6. The system of claim 5, wherein the ICNN is trained using Softplus activation.

7. The system of claim 5, wherein the plural data pairs are image pairs.

8. The system of claim 5, wherein the plural data pairs are text pairs.

9. A computer program product for configuring a computer for data similarity determination using Bregman divergence, the computer program product comprising:

a non-transitory computer-readable storage medium having program instructions embodied therewith, the program instructions executable by a computer to cause the computer to perform a method, including:
storing a data set, the data set having plural data pairs with one or more data points corresponding to one or more features, wherein a first given feature of a first piece of data in a first data pair has a known target distance to a second given feature of a second piece of data in the first data pair;
training an input convex neural network (ICNN) using the data set, the ICNN having one or more parameters, wherein training the ICNN includes:
for each data pair within the data set:
    extracting the one or more features for each piece of data in the first data pair;
    generating an empirical Bregman divergence for the data pair; and
    computing one or more gradients between the one or more features within the first data pair based on the known target distance between the one or more features of the first data pair and the empirical Bregman divergence, the one or more gradients being computed using double backpropagation, automatic differentiation to compute the one or more gradients with respect to one or more data inputs, and a dot-product between the one or more gradients and another value;
generating a trained ICNN configured to output an arbitrary Bregman divergence function within a space of all possible Bregman divergences for a data pair based on the one or more gradients;
receiving a data file, the data file having one or more features;
inputting the data file into the trained ICNN;
generating a Bregman function for each of the one or more features of the data file, wherein the one or more features include at least one of curvature and angularity;
calculating a distance between the one or more features of the data file and the one or more data points of the plural data pairs; and
outputting a classification of the data file based on the calculated distance.

10. The computer program product of claim 9, wherein the ICNN is trained using Softplus activation.

11. The computer program product of claim 9, wherein the plural data pairs are image pairs.

12. The computer program product of claim 9, wherein the plural data pairs are text pairs.

* * * * *